United States Patent
Jungk et al.

(10) Patent No.: US 10,701,062 B2
(45) Date of Patent: Jun. 30, 2020

(54) METHOD FOR IMPROVING INFORMATION SECURITY FOR VEHICLE-TO-X COMMUNICATION, AND COMMUNICATION APPARATUS

(71) Applicant: Continental Teves AG & Co. oHG, Frankfurt (DE)

(72) Inventors: Bernhard Jungk, Ulm (DE); Henrik Antoni, Freigericht (DE)

(73) Assignee: Continental Teves AG & Co. oHG (DE)

( * ) Notice: Subject to any disclaimer, the term of this patent is extended or adjusted under 35 U.S.C. 154(b) by 200 days.

(21) Appl. No.: 16/063,871

(22) PCT Filed: Jan. 24, 2017

(86) PCT No.: PCT/DE2017/200006
§ 371 (c)(1),
(2) Date: Jun. 19, 2018

(87) PCT Pub. No.: WO2017/144056
PCT Pub. Date: Aug. 31, 2017

(65) Prior Publication Data
US 2018/0375853 A1    Dec. 27, 2018

(30) Foreign Application Priority Data
Feb. 23, 2016   (DE) .................. 10 2016 202 790

(51) Int. Cl.
*H04L 29/06*     (2006.01)
*H04W 4/70*      (2018.01)
(Continued)

(52) U.S. Cl.
CPC .......... *H04L 63/0823* (2013.01); *H04W 4/40* (2018.02); *H04W 4/70* (2018.02); *H04W 12/06* (2013.01)

(58) Field of Classification Search
CPC ...... H04L 63/0823; H04W 4/40; H04W 4/70; H04W 12/06; H04W 12/0609
(Continued)

(56) References Cited

U.S. PATENT DOCUMENTS

2011/0213968 A1* 9/2011 Zhang .................. H04L 67/12
                                                    713/158
2011/0238986 A1  9/2011 Kherani et al.
(Continued)

FOREIGN PATENT DOCUMENTS

DE    102010029418 A1   12/2010
DE    102010045894 A1   7/2011

OTHER PUBLICATIONS

International Search Report and Written Opinion for International Application No. PCT/DE2017/200006, dated Mar. 28, 2017, 8 pages.

*Primary Examiner* — Mohammad W Reza
(74) *Attorney, Agent, or Firm* — RatnerPrestia

(57) ABSTRACT

A method for improving information security for vehicle-to-X communication, wherein the vehicle-to-X communication is protectable by at least one certificate, wherein the certificate for protecting the vehicle-to-X communication has a validity period of defined length and is provided for storage in a memory of a vehicle, wherein the method is additionally distinguished in that the vehicle uses a communication link for wireless data interchange between the vehicle and a backend system, before expiry of the validity period of the certificate and a change to a validity period of defined length for an updated certificate, to ask the backend system to provide an up-to-date piece of time information for the vehicle. In addition, the invention relates to a corresponding communication apparatus for vehicle-to-X communication.

12 Claims, 1 Drawing Sheet

(51) Int. Cl.
*H04W 12/06* (2009.01)
*H04W 4/40* (2018.01)

(58) Field of Classification Search
USPC .......................................................... 713/156
See application file for complete search history.

(56) References Cited

U.S. PATENT DOCUMENTS

2011/0296190 A1* 12/2011 Paeschke ................ B60R 13/10
 713/176
2017/0171191 A1* 6/2017 Cignetti .................. H04L 63/06

\* cited by examiner

METHOD FOR IMPROVING INFORMATION SECURITY FOR VEHICLE-TO-X COMMUNICATION, AND COMMUNICATION APPARATUS

CROSS REFERENCE TO RELATED APPLICATIONS

This application is the U.S. National Phase Application of PCT International Application No. PCT/DE2017/200006, filed Jan. 24, 2017, which claims priority to German Patent Application No. DE 10 2016 202 790.5, filed Feb. 23, 2016, the contents of such applications being incorporated by reference herein.

FIELD OF THE INVENTION

The present invention relates to a method for improving information security for vehicle-to-X communication, as well as a corresponding communication apparatus.

BACKGROUND OF THE INVENTION

Future vehicle systems can be configured to interchange data, e.g. by means of vehicle-to-X communication (also referred to as "Car2X"). In particular, unprotected communication systems can, however, be manipulated, wherein for example spurious messages can be emitted and consequently malfunctions can be caused. Therefore, the information security of the relevant systems is pertinent to the protection of road users.

Messages to be sent can be protected by also sending pseudonym certificates which are embedded in the relevant message. Certificates usually have a specific temporal term of validity which is defined by a start and an expiration date. A new certificate must be used following the expiration date. By providing certificates with differently defined temporal terms of validity in a vehicle, a period which is longer overall can be attained with valid certificates, with certificates with a short validity. For example, 20 certificates with consecutive validity periods having a length of one week can be provided. To this end, it is assumed that the certificates can be updated during the maintenance interval of the vehicles, i.e. after approximately 2 years. This means that the vehicles would also have to carry certificates with a validity of up to 2 years in advance in a memory which is provided for this purpose. A revocation of the certificates is not envisaged.

The disadvantage of this prior art is that, in the event of a third party successfully accessing the code and certificate memory, bogus messages with a certificate which will actually only be valid in the future can be emitted. As a countermeasure, a very secure code and certificate memory could be provided, but the disadvantage of this is the comparative high cost.

SUMMARY OF THE INVENTION

Consequently an aspect of the invention aims to provide a method for improving information security for vehicle-to-X communication.

An aspect of the invention relates to a method for improving information security for vehicle-to-X communication, wherein the vehicle-to-X communication is protectable by means of at least one certificate, wherein the certificate for protecting the vehicle-to-X communication has a validity period of defined length and is provided for storage in a memory of a vehicle. In addition, it is envisaged that the vehicle uses a communication link for wireless data interchange between the vehicle and a backend system, before expiry of the validity period of the certificate and a change to a validity period of defined length for an updated certificate, to ask the backend system to provide an up-to-date piece of time information for the vehicle.

An aspect of the invention is based on the idea that a relevant system is protected against external access (attackers) on the basis of a manipulation of the system time. This prevents the possibility of certificates from any periods being used to send, for example, bogus messages by means of a vehicle-to-X communication apparatus.

The term "backend system" means, for example, a server of a trustworthy cryptographic certificate authority for providing certificates, wherein the backend system is configured to communicate data with the communication apparatus for vehicle-to-X communication of the vehicle.

Examples of certificates or respectively cryptographic certificates are public key certificates (e.g. X.509) or attribute certificates.

The term "updated certificate for vehicle-to-X communication" means, in particular, the issuing of a new certificate by the certificate authority.

According to an advantageous further development of an aspect of the invention, a validation of the vehicle time is carried out by means of comparison with a piece of time information provided by the backend system, wherein in the event of plausibility being established, the change is made to the validity period of the updated certificate.

According to a further development, a protection of the communication link for data interchange between the vehicle and the backend system is provided. In other words, the communication with the backend system is likewise protected (security) in accordance with a particularly preferred embodiment. This protection is expediently realized by means of a certificate which is preferably stored by the vehicle in such a way that it is tamper-proof. The backend system consequently preferably uses a corresponding certificate in order to generate signed time messages which the vehicle can validate by means of the certificate stored by the vehicle. The validity of the certificate for protecting the communication link between the vehicle and the backend system can, for example, apply for significantly longer, depending on the level of reliability of the backend system, than the certificates for protecting the vehicle-to-X communication, for example beyond a standard maximum lifetime of the vehicle. According to one embodiment, the certificate for protecting the communication link with the backend system is valid for a shorter period than the lifetime of the vehicle, wherein the certificate is preferably renewed at regular intervals. To this end, the certificate can, in particular in the case of a request by the vehicle, be transferred from the backend system to the vehicle, which is in particular effected before an expiration date of the validity period of the certificate for protecting the vehicle-to-X communication, which is still valid at this time. This certificate is expediently saved in a memory of the vehicle, which is particularly protected against access, wherein the certificate which was previously up-to-date is deleted as soon as the validity period has expired and, in particular, as soon as the backend system has confirmed a time which is after the expiry date of the validity period of the certificate which was previously up-to-date.

The backend system is preferably merely asked, after a defined number of validity periods, to provide an up-to-date piece of time information.

The updated certificate is preferably provided to the vehicle by the backend system. The storage of certificates by the vehicle, which are valid, for example, for a period of time of up to 2 years in the future, can, due to the possible more frequent updating, be advantageously reduced to a shorter period of time of, for example, a few weeks. Consequently, the information security of vehicle-to-X communication can be substantially improved.

In accordance with an advantageous further development of an aspect of the invention, before expiry of the validity period of the certificate, the vehicle asks the backend system to provide the updated certificate for the vehicle. In particular, it is envisaged that the request to provide the up-to-date piece of time information for the vehicle is made within the framework of the communication.

A temporal overlapping of the validity periods of the certificate and of the updated certificate is preferably provided. In other words, a temporal overlapping of the validity periods of immediately consecutive certificates can be provided, wherein a start time of the validity period of the updated certificate temporally precedes an expiration date of the validity period of the certificate. The backend prompt to provide an up-to-date piece of time information and/or an updated certificate is expediently provided by the vehicle in sufficient time prior to the expiration date of the certificate to allow the operation to be concluded.

A backend prompt to provide an up-to-date piece of time information and/or an updated certificate is preferably triggered by the vehicle by means of a vehicle-to-X communication apparatus, to which at least one certificate is assigned.

The validity period of a period is preferably such that this is longer than standard periods of time in which a vehicle is not moved or is operated in areas without a link to the backend system. The certificates can then be updated during the next link to the backend system.

According to a preferred further development, the backend system can trigger a deletion of the memory for storing the certificates or an overwriting of the certificates in the memory, which have invalid data, or can send a message to the vehicle, as a consequence of which the vehicle is prevented from emitting defined messages. In other words, a revocation is preferably carried out by an overwriting of the memory which has invalid data, which is triggered by the backend system, or by a deletion of the certificates. In addition to updating the certificates, the cyclical communication with the backend system consequently advantageously opens up the possibility of preventing externally controlled systems from sending further messages or of marking the messages of the systems as unusable.

The issuing of certificates with defined permissions for the vehicle can also preferably be dispensed with by the backend system, as a result of which the valid vehicle-to-X messages sent or to be sent are advantageously successfully limited to a specific subset. Expediently, the messages of this subset are not potentially safety-critical messages, the substance of which is not essentially of relevance to road users, so that in the event of these being falsified, no safety critical situations can be caused. The invalidity of the certificates can be identified, e.g. by a signing certificate authority.

In accordance with a further development of an aspect of the invention, in the event that the period of validity of a certificate for vehicle-to-X communication has expired, an updating of a certificate is effected as follows:

The vehicle sends a backend prompt in order to receive an up-to-date piece of time information, wherein the backend system recognizes that the vehicle is using an outdated piece of time information, An up-to-date piece of time information and/or an updated certificate for protecting the communication with the backend system, and an update of the certificate is sent by the backend system to the vehicle, The vehicle sets the system time to the piece of time information provided by the backend system and sets the system to use the up-to-date certificate henceforth.

A certificate for communicating with the backend system, which has already expired, for example because the vehicle has been standing for a very long period of time, can be advantageously updated.

The communication of the vehicle with the backend system can be particularly preferably realized by means of a mobile communications link such as e.g. the mobile communications standard 3G or 4G. Alternatively or in addition to mobile communications, the vehicle can preferably communicate with the backend systems by means of vehicle-to-X communication, for example via stations of the infrastructure.

Furthermore, an aspect of the invention relates to a communication apparatus for vehicle-to-X communication, comprising:
  communication means for wireless data interchange between a vehicle and a backend system for providing digital certificates with a defined validity period,
  a processor for processing communication data which can be transmitted and received by means of the communication means,
  a memory for storing at least one certificate for protecting the vehicle-to-X communication and at least one updated certificate, wherein the communication apparatus is configured, before expiry of the validity period of the certificate and a change to a validity period of defined length for the updated certificate, to ask the backend system to provide an up-to-date piece of time information for the vehicle. The communication apparatus according to an aspect of the invention is, in addition, preferably configured to carry out at least one embodiment of the method according to an aspect of the invention.

In a further development of the indicated communication apparatus, the indicated apparatus has a memory for storing a computer program and a processor. In this case, the indicated method is stored in the memory in the form of a computer program and the processor is provided to execute the method, if the computer program is loaded from the memory into the processor.

According to another aspect of the invention, a computer program comprises program code means in order to execute all of the steps of one of the indicated methods, if the computer program is run on a computer or one of the indicated apparatuses.

According to another aspect of the invention, a computer program product contains a program code which is stored on a computer-readable data carrier and which, if it is run on a data processing device, carries out one of the indicated methods.

BRIEF DESCRIPTION OF THE DRAWINGS

Some particularly advantageous configurations of aspects of the invention are indicated in the subordinate claims. Further preferred embodiments are set out in the following description of embodiment examples with reference to the appended figures, in which:

DETAILED DESCRIPTION OF THE PREFERRED EMBODIMENTS

Figure 1:
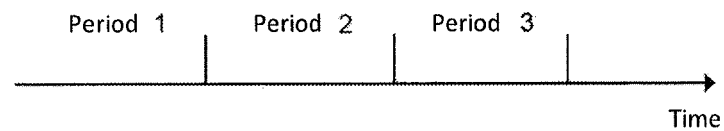
FIG. 1 shows a timing diagram in order to explain a procedure for improving the information security for vehicle-to-X communication.

FIG. 1 shows a timing diagram in order to explain a procedure for improving the information security for vehicle-to-X communication by means of certificates stored in the vehicle. In accordance with this procedure, consecutive certificates, each having a defined validity period: Period 1, Period 2 and Period 3, etc., are provided in the memory of the vehicle, wherein following a preceding period 1 of a certificate, a subsequent period 2 of another certificate or of the updated certificate from period 1 follows without interruption. The same procedure is adopted following the expiry of period 2. Consequently, by distributing the certificate(s) over multiple periods, a period of time which corresponds to a total of, for example, the three periods is covered. To this end, it is assumed that the certificates can be updated during the maintenance interval of the vehicles, i.e. after approximately 2 years. This means that the vehicles also carry certificates having a validity of up to 2 years in advance in a memory which is provided for this purpose. The memory is preferably a (security) code and/or certificate memory which is protected against access.

Figure 2:
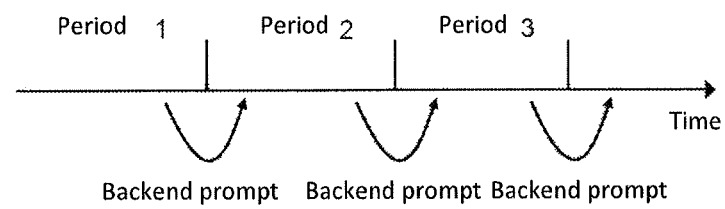
FIGS. 2 and 3 show timing diagrams of preferred embodiment examples of the method according to an aspect of the invention for improving information security for vehicle-to-X communication
Figure 3:
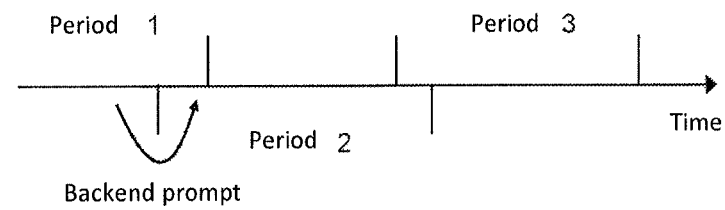

FIGS. 2 and 3 show timing diagrams of preferred embodiment examples of the method according to an aspect of the invention for improving information security for vehicle-to-X communication, in which certificates assigned to the vehicle and stored in a memory of the vehicle are cyclically updated by means of a communication apparatus for data interchange between a vehicle and a backend system for providing digital certificates. A trustworthy cryptographic certificate authority can be enlisted as a backend system, for example.

In accordance with the embodiment examples of FIGS. 2 and 3, before the expiry of a validity period of a period, the trustworthy backend system is asked to obtain an up-to-date reliable time. As a result, a relevant system can be advantageously protected, for example, against external access (attackers) on the basis of a manipulation of the system time—as a result of which certificates and codes could be used from any periods. A change in the certificate or respectively period is, in this case, preferably not permitted until it has been possible for the vehicle also carrying the certificate to validate the vehicle time in this way by means of the piece of time information received from the backend system.

In accordance with the embodiment example of FIG. 3, a temporal overlapping of the validity periods of the certificates is additionally provided. In this case, the start date of the subsequent period is arranged temporally before the expiration date of the period preceding this subsequent period. This ensures that the availability of the system is not adversely affected during a change in the periods or respectively certificates. Accordingly, the request to the backend system is preferably timed to be made before the start of the subsequent validity period becoming effective, and prior to the expiration date of the up-to-date certificate or respectively the period preceding the subsequent period. This makes possible a larger temporal tolerance with respect to those cases where the backend system is not available for specific times, as the up-to-date certificate continues to be valid.

In accordance with a preferred further development as shown in FIG. 3, the backend system is not asked for an up-to-date time until after a defined number of periods, meaning that the availability can be further increased. However, since the time between the backend requests is longer, the information security can be reduced, in particular with respect to possible external access.

If in the course of the proceedings it transpires that a feature or a group of features is not absolutely necessary, then the applicant here and now seeks a wording of at least one independent claim, no longer having the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the figures, can be combined with one another as desired. Individual or multiple features are interchangeable as desired. Resulting combinations of features are understood to also be covered by the disclosure of this application.

Back references in subordinate claims should not be construed as a waiver of the attainment of independent, objective protection for the features of the subordinate claims referred back to. These features can also be used in any combination with other features.

Features which are merely disclosed in the description or features which are disclosed in the description or in a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). The invention expressly does not, however, exclude vehicle-to-X communication with the intermediary of, for example, a mobile network.

The invention claimed is:

1. A method for improving information security for vehicle-to-X communication, the method comprising:
storing, in a memory of a vehicle, a plurality of certificates for protecting the vehicle-to-X communication, each of the certificates having a respective validity period of a defined length;
before expiry of the validity period of a first certificate of the plurality of certificates, sending a request, from the vehicle to a backend system via a communication link for wireless data interchange, request the backend system to provide an up-to-date piece of time information for the vehicle; and switching, by the vehicle, from using the first certificate of the plurality of certificates for protecting the vehicle-to-X communication, to using a second certificate of the plurality of certificates for protecting the vehicle-to-X communication, when the validity period of the second certificate corresponds to the up-to-date piece of time information.

2. The method according to claim 1, wherein the vehicle carries out a validation of the vehicle time by comparison with a piece of time information provided by the backend system, wherein in the event of plausibility being established, the change is made to the validity period of the updated certificate.

3. The method according to claim 1, wherein protection of the communication link for data interchange between the vehicle and the backend system is provided.

4. The method according to claim 1, wherein the backend system is asked, after a defined number of validity periods, to provide an up-to-date piece of time information.

5. The method according to claim 1, wherein the updated certificate is provided to the vehicle by the backend system.

6. The method according to claim 1, wherein before expiry of the validity period of the certificate, the vehicle asks the backend system to provide the updated certificate for the vehicle.

7. The method according to claim 1, wherein a temporal overlapping of the validity periods of the certificate and of the updated certificate is provided.

8. The method according to claim 6, wherein the backend system is asked, after a defined number of validity periods, to provide an up-to-date piece of time information.

9. The method according to claim 1, wherein in the event that the validity period of a certificate for vehicle-to-X communication has expired, an updating of the certificate is carried out as follows:

the vehicle sends a backend prompt in order to receive an up-to-date piece of time information, wherein the backend system recognizes that the vehicle is using an outdated piece of time information, the backend system sends an up-to-date piece of time information and/or an updated certificate for protecting the communication with the backend system, and an update of the certificate to the vehicle, and the vehicle sets the system time to the piece of time information provided by the backend system and sets the system to use the updated certificate hence forth.

10. A communication apparatus for vehicle-to-X communication, comprising:

communication means for wireless data interchange between a vehicle and a backend system, a processor for processing communication data which can be transmitted and received by the communications means, a memory for storing a plurality of certificates for protecting the vehicle-to-X communication, each of the certificates having a respective validity period of a defined length, wherein the processor is configured to:

before expiry of the validity period of a first certificate of the plurality of certificates, send a request, from the vehicle to the backend system via a communication means, to request the backend system to provide an up-to-date piece of time information for the vehicle, and switch from using the first certificate of the plurality of certificates for protecting the vehicle-to-X communication, to using a second certificate of the plurality of certificates for protecting the vehicle-to-X communication, when the validity period of the second certificate corresponds to the up-to-date piece of time information.

11. The method according to claim 2, wherein protection of the communication link for data interchange between the vehicle and the backend system is provided.

12. The method according to claim 7, wherein the backend system is asked, after a defined number of validity periods, to provide an up-to-date piece of time information.

* * * * *